(12) United States Patent
Ketchum

(10) Patent No.: US 7,881,360 B2
(45) Date of Patent: *Feb. 1, 2011

(54) METHOD AND SYSTEM FOR INCREASED BANDWIDTH EFFICIENCY IN MULTIPLE INPUT—MULTIPLE OUTPUT CHANNELS

(75) Inventor: John W. Ketchum, Harvard, MA (US)

(73) Assignee: QUALCOMM Incorporated, San Diego, CA (US)

( * ) Notice: Subject to any disclaimer, the term of this patent is extended or adjusted under 35 U.S.C. 154(b) by 958 days.

This patent is subject to a terminal disclaimer.

(21) Appl. No.: 10/810,442

(22) Filed: Mar. 26, 2004

(65) Prior Publication Data

US 2004/0179626 A1    Sep. 16, 2004

Related U.S. Application Data

(63) Continuation of application No. 09/737,602, filed on Jan. 5, 2001, now Pat. No. 6,731,668.

(51) Int. Cl.
    *H04B 1/00*    (2006.01)
(52) U.S. Cl. .................. 375/130; 375/267; 375/299; 370/209
(58) Field of Classification Search .................. 375/130, 375/140, 142–143, 147–150, 152; 370/208–209
    See application file for complete search history.

(56) References Cited

U.S. PATENT DOCUMENTS

| 4,901,307 A | 2/1990 | Gilhousen et al. |
| 5,103,459 A | 4/1992 | Gilhousen et al. |
| 5,471,497 A * | 11/1995 | Zehavi ..................... 375/142 |

(Continued)

FOREIGN PATENT DOCUMENTS

EP    0869623    10/1998

(Continued)

OTHER PUBLICATIONS

Thompson, et al.: "Downlink Transmit Diversity Schemes For CDMA Networks", IEE Proc.-Commun., vol. 147, No. 6, Dec. 2000.

(Continued)

*Primary Examiner*—Jean B Corrielus
(74) *Attorney, Agent, or Firm*—Rupit Patel; Mary A. Fales

(57) ABSTRACT

In one disclosed embodiment, an input bit stream is supplied to a trellis code block. For example, the trellis code block can perform convolutional coding using a rate 6/7 code. The output of the trellis code block is then modulated using, for example, trellis coded quadrature amplitude modulation with 128 signal points or modulation symbols. The sequence of modulation symbols thus generated can be diversity encoded. The diversity encoding can be either a space time encoding, for example, or a space frequency encoding. The sequence of modulation symbols, or the sequence of diversity encoded modulation symbols, is fed to two or more orthogonal Walsh covers. For example, replicas of the modulation symbol sequences can be provided to increase diversity, or demultiplexing the modulation symbol sequences can be used to increase data transmission rate or "throughput." The outputs of the Walsh covers are fed as separate inputs into a communication channel.

36 Claims, 8 Drawing Sheets

U.S. PATENT DOCUMENTS

| | | | | |
|---|---|---|---|---|
| 5,619,526 | A * | 4/1997 | Kim et al. | 370/335 |
| 5,652,764 | A | 7/1997 | Kanzaki et al. | |
| 5,729,570 | A | 3/1998 | Magill | |
| 5,734,967 | A * | 3/1998 | Kotzin et al. | 455/63.1 |
| 5,761,634 | A * | 6/1998 | Stewart et al. | 704/220 |
| 5,781,542 | A | 7/1998 | Tanaka et al. | |
| 6,169,751 | B1 | 1/2001 | Shirakata et al. | |
| 6,185,199 | B1 * | 2/2001 | Zehavi | 370/335 |
| 6,252,864 | B1 | 6/2001 | Hayashi | |
| 6,324,206 | B1 * | 11/2001 | Rotstein et al. | 375/140 |
| 6,366,778 | B1 * | 4/2002 | Bender et al. | 455/442 |
| 6,421,333 | B1 * | 7/2002 | Jalali | 370/342 |
| 6,483,828 | B1 * | 11/2002 | Balachandran et al. | 370/342 |
| 6,735,185 | B1 * | 5/2004 | Noneman | 370/335 |
| 6,788,661 | B1 * | 9/2004 | Ylitalo et al. | 370/334 |
| 6,847,677 | B1 * | 1/2005 | Schlegel et al. | 375/146 |
| 6,870,826 | B1 | 3/2005 | Ishizu | |
| 6,917,655 | B2 | 7/2005 | Fimoff et al. | |
| 7,009,953 | B2 * | 3/2006 | Tiedemann, Jr. | 370/332 |
| 7,072,324 | B1 * | 7/2006 | Kim et al. | 370/342 |
| 7,154,846 | B2 * | 12/2006 | Chen et al. | 370/209 |
| 7,305,609 | B2 | 12/2007 | Gutierrez, Jr. | |
| 2002/0105929 | A1 | 8/2002 | Chen et al. | |
| 2002/0122398 | A1 * | 9/2002 | Jou | 370/335 |
| 2003/0123525 | A1 * | 7/2003 | Smee et al. | 375/147 |
| 2004/0101032 | A1 | 5/2004 | Dabak et al. | |

FOREIGN PATENT DOCUMENTS

| | | |
|---|---|---|
| WO | 0014921 | 3/2000 |
| WO | 0064073 | 10/2000 |

OTHER PUBLICATIONS

International Search Report - PCT/US0/021993, International Searching Authority - European Patent Office, Nov. 4, 2003.
International Preliminary Examination Report - PCT/US02/021993 - IPEA/US, Dec. 20, 2004.

* cited by examiner

METHOD AND SYSTEM FOR INCREASED BANDWIDTH EFFICIENCY IN MULTIPLE INPUT—MULTIPLE OUTPUT CHANNELS

CLAIM OF PRIORITY UNDER 35 U.S.C. §120

The present Application for Patent is a Continuation and claims priority to patent application Ser. No. 09/737,602 entitled "Method and System for Increased Bandwidth Efficiency in Multiple Input-Multiple Output Channels," filed Jan. 5, 2001, now U.S. Pat. No. 6,731,668 now allowed, and assigned to the assignee hereof.

BACKGROUND

1. Field

The present invention generally relates to the field of wireless communication systems. More specifically, the invention relates to transmission for wideband code division multiple access communication systems using multiple input multiple output channels.

2. Background

In wireless communication systems several users share a common communication channel. To avoid conflicts arising from several users transmitting information over the communication channel at the same time, some regulation on allocating the available channel capacity to the users is required. Regulation of user access to the communication channel is achieved by various forms of multiple access protocols. One form of protocol is known as code division multiple access (CDMA). In addition to providing multiple access allocation to a channel of limited capacity, a protocol can serve other functions, for example, providing isolation of users from each other, i.e. limiting interference between users, and providing security by making interception and decoding difficult for a non-intended receiver, also referred to as low probability of intercept.

In CDMA systems each signal is separated from those of other users by coding the signal. Each user uniquely encodes its information signal into a transmission signal. The intended receiver, knowing the code sequences of the user, can decode the transmission signal to receive the information. The encoding of the information signal spreads its spectrum so that the bandwidth of the encoded transmission signal is much greater than the original bandwidth of the information signal. For this reason CDMA is also referred to as "spread spectrum" modulation or coding. The energy of each user's signal is spread across the channel bandwidth so that each user's signal appears as noise to the other users. So long as the decoding process can achieve an adequate signal to noise ratio, i.e. separation of the desired user's signal from the "noise" of the other users' signals, the information in the signal can be recovered. Other factors which affect information recovery of the user's signal are different conditions in the environment for each subscriber, such as fading due to shadowing and multipath. Briefly, shadowing is interference caused by a physical object interrupting the signal transmission path between the transmitter and receiver, for example, a large building. Multipath is a signal distortion which occurs as a result of the signal traversing multiple paths of different lengths and arriving at the receiver at different times. Multipath is also referred to as "time dispersion" of the communication channel. Multipath fading may also vary with time. For example, in a communication unit being carried in a moving car, the amount of multipath fading can vary rapidly.

A number of methods have been implemented to provide effective coding and decoding of spread spectrum signals. The methods include error detection and correction codes, and convolutional codes. In wireless communications, especially in voice communications, it is desirable to provide communication between two users in both directions simultaneously, referred to as duplexing or full-duplexing. One method used to provide duplexing with CDMA is frequency division duplexing. In frequency division duplexing, one frequency band is used for communication from a base station to a mobile user, called the forward channel, and another frequency band is used for communication from the mobile user to the base station, called the reverse channel. A forward channel may also be referred to as a downlink channel, and a reverse channel may also be referred to as an uplink channel. Specific implementation of coding and modulation may differ between forward and reverse channels.

The information in the user's signal in the form of digital data is coded to protect it from errors. Errors may arise, for example, as a result of the effects of time-varying multipath fading, as discussed above. The coding protects the digital data from errors by introducing redundancy into the information signal. Codes used to detect errors are called error detection codes, and codes which are capable of detecting and correcting errors are called error correction codes. Two basic types of error detection and correction codes are block codes and convolutional codes.

Convolutional codes operate by mapping a continuous information sequence of bits from the digital information of the user's signal into a continuous encoded sequence of bits for transmission. By way of contrast, convolutional codes are different from block codes in that information sequences are not first grouped into distinct blocks and encoded. A convolutional code is generated by passing the information sequence through a shift register. The shift register contains, in general, N stages with k bits in each stage and n function generators. The information sequence is shifted through the N stages k bits at a time, and for each k bits of the information sequence the n function generators produce n bits of the encoded sequence. The rate of the code is defined as R=k/n, and is equal to the input rate of user information being coded divided by the output rate of coded information being transmitted. The number N is called the constraint length of the code; complexity—or computing cost—of the code increases exponentially with the constraint length. A convolutional code of constraint length 9 and code rate 3/4, for example, is used in some CDMA systems.

The highly structured nature of the mapping of the continuous information sequence of bits into continuous encoded sequence of bits enables the use of decoding algorithms for convolutional codes which are considerably different from those used for block codes. The coding performed by a particular convolutional code can be represented in various ways. For example, the coding may be represented by generator polynomials, logic tables, state diagrams, or trellis diagrams. If the coding is represented by a trellis diagram, for example, the particular trellis diagram representation will depend on the particular convolutional code being represented. The trellis diagram representation depends on the convolutional code in such a way that decoding of the encoded sequence can be performed if the trellis diagram representation is known.

For signal transmission, convolutional coding may be combined with modulation in a technique referred to as "trellis coded modulation." Trellis coded modulation integrates the convolutional coding with signal modulation in such a way that the increased benefit of coding more than offsets the additional cost of modulating the more complex signal. One way to compare different methods of signal transmission is to compare the bandwidth efficiency. Bandwidth efficiency is typically measured by comparing the amount of information transmitted for a given bandwidth, referred to as the "normalized data rate," to the SNR per bit. The maximum normalized data rate that can possibly be achieved for a given SNR per bit is the theoretical maximum capacity of the channel, referred to as the "Shannon capacity" of the channel. The more bandwidth efficient a method of signal transmission is, the more nearly it is able to use the full Shannon capacity of the channel. A channel with multiple transmit antennas and multiple receive antennas which uses all possible signal paths between each pair of transmit and receive antennas, referred to as a multiple input multiple output ("MIMO") channel, is known to have a higher Shannon capacity under certain channel conditions than a similar channel which uses only one transmit-receive antenna pair.

For signal reception, the signal must be demodulated and decoded. There are many methods of decoding convolutional codes, also referred to as "detection." One method of decoding convolutional codes that uses the trellis diagram representation is Viterbi decoding. In the trellis diagram, each path through the trellis corresponds to a possible encoded sequence from the convolutional coder and the original information sequence that generated the encoded sequence. The Viterbi algorithm uses the encoded sequence actually received to determine a value of a metric for some of the paths through the trellis and to eliminate other paths from consideration. Finally, the decoder chooses a path through the trellis with the most favorable value of the metric, and the corresponding information sequence is thereby decoded. Thus, the Viterbi decoder provides maximum likelihood detection, as known in the art.

As stated above, one of the objects of coding is to protect the information in the user's signal from errors caused by various phenomena, for example, multipath fading. Another collection of techniques which can be used to increase signal reliability is referred to as "diversity." Simply stated, diversity exploits the random nature of radio propagation by supplying to the receiver several replicas of the same information signal transmitted over independently fading—i.e. highly uncorrelated—signal paths for communication. For example, if one radio signal path undergoes a deep fade, another independent path may have a strong signal. By having more than one path to select from the signal to noise ratio of the information signal can be improved. One implementation of diversity is the RAKE receiver, which employs several antennas at the receiver to provide a selection of different signal paths. A shortcoming of the RAKE receiver is that its effectiveness breaks down at high data rates. One means of counteracting the effects of time dispersion or multipath is the use of orthogonal frequency division multiplexing ("OFDM") as known in the art. OFDM works well at high data rates and thus avoids the shortcoming of ineffectiveness at high data rates with the RAKE receiver.

A further collection of techniques which can be used to increase signal reliability is referred to as "power control." Simply stated, power control adjusts the power of the signal at the transmitter while the signal is being transmitted in order to compensate for varying conditions in the communication channel, such as relative movement of different users and multipath fading. Power control relies on the transmission of information regarding the condition of the channel, or "channel state information" (CSI) from the receiving unit back to the transmitter. Thus, power control is a CSI technique. There are other CSI techniques which involve, for example, the use of separate "pilot signals" and "training periods" of signal transmission. Diversity techniques, on the other hand are non-CSI techniques, in that no separate transmission of channel condition information is required for their implementation. In general, non-CSI techniques can be simpler and less costly to implement because non-CSI techniques avoid the complexity of transmitting channel state information.

Moreover, non-CSI techniques have an advantage over CSI techniques in that non-CSI techniques avoid incurring the "overhead" of transmitting channel state information, i.e. non-user information, on the channel. To the extent that channel capacity, i.e. the Shannon capacity for a given SNR per bit, is used to transmit non-user information, i.e. CSI, less channel capacity is available for transmitting user information, and the effective bandwidth efficiency of the transmission is, therefore, reduced. A channel which is not stable or for which channel conditions do not change slowly enough can require transmitting channel state information at high data rates to keep up with changes in channel condition in order for the transmitter to be able to make effective use of the channel state information. Thus, non-CSI techniques can provide an advantage for mobile communications where channel conditions are subject to rapid change.

The advantages of increased channel capacities of MIMO channels have been used in conjunction with a number of CSI techniques. The use of non-CSI techniques such as coding, diversity, and OFDM can also be used to improve the error performance and "throughput," i.e. the data rate of user information, for wireless communications. Thus, there is a need in the art for taking advantage of the increased capacity of MIMO channels by increasing the effective bandwidth efficiency of transmission in MIMO channels while avoiding the disadvantages of transmitting channel state information. There is also a need in the art to provide improvements in error performance, data rate, and capacity of wireless communications in MIMO channels by exploiting increased bandwidth efficiency.

SUMMARY

The present invention is directed to method and system for increased bandwidth efficiency in multiple input—multiple output channels. The invention overcomes the need in the art for increasing bandwidth efficiency while avoiding the disadvantages of transmitting channel state information. Also the invention provides improvements in error performance, data rate, and capacity of wireless communications in multiple input multiple output channels.

In one aspect of the invention an input bit stream is supplied to a trellis code block. For example, the trellis code block can perform convolutional coding using a rate 6/7 code. The output of the trellis code block is then modulated using, for example, trellis coded quadrature amplitude modulation with 128 signal points or modulation symbols. The sequence of modulation symbols thus generated can be diversity encoded. The diversity encoding can be either a space time encoding, for example, or a space frequency encoding. The sequence of modulation symbols, or the sequence of diversity encoded modulation symbols, is fed to two or more orthogonal Walsh covers. For example, replicas of the modulation symbol sequences can be provided to increase diversity, or demultiplexing the modulation symbol sequences can be used to increase data transmission rate or "throughput." The outputs of the Walsh covers are fed as separate inputs into a communication channel. The communication channel can be, for example, a multiple input multiple output channel in a WCDMA communication system.

DETAILED DESCRIPTION

The presently disclosed embodiments are directed to method and system for increased bandwidth efficiency in multiple input—multiple output channels. The following description contains specific information pertaining to the implementation of the presently disclosed embodiments. One skilled in the art will recognize that the presently disclosed embodiments may be implemented in a manner different from that specifically discussed in the present application. Moreover, some of the specific details of the disclosed embodiments are not discussed in order not to obscure the invention. The specific details not described in the present application are within the knowledge of a person of ordinary skill in the art.

The drawings in the present application and their accompanying detailed description are directed to merely example embodiments. To maintain brevity, other embodiments which use the principles of the present invention are not specifically described in the present application and are not specifically illustrated by the present drawings.

Figure 1:
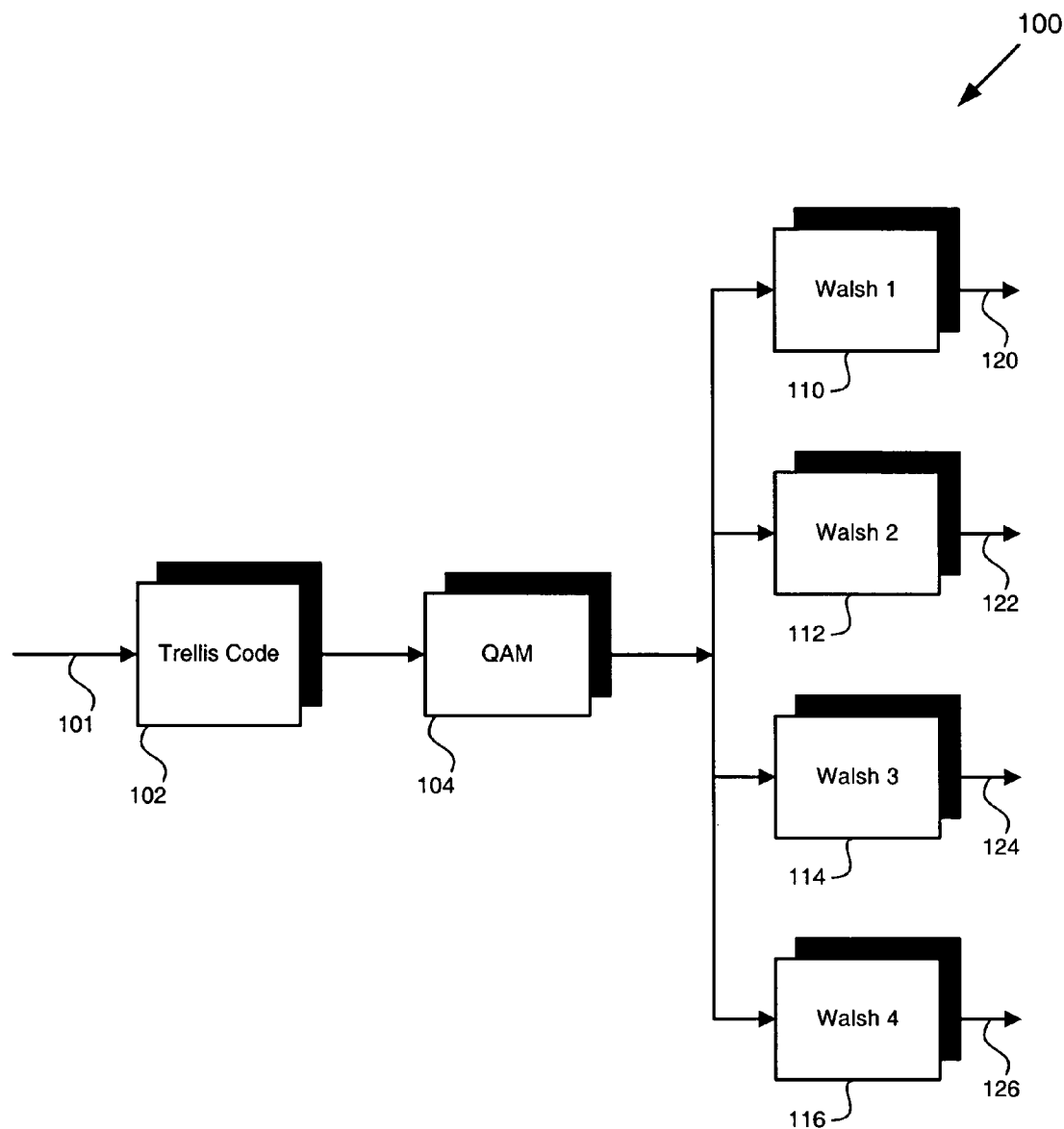
FIG. 1 illustrates, in block diagram form, one example of communication channel multiple input orthogonality for one embodiment of the present invention in an exemplary communication system.

FIG. 1 illustrates an example of orthogonality of multiple inputs to a communication channel in accordance with one embodiment. Exemplary system 100 shown in FIG. 1 constitutes part of a transmitter which may generally reside in a base station, gateway, or satellite repeater when communication is taking place in a forward channel. Exemplary system 100 can be part of a base station transmitter, for example, in a wideband code division multiple access (WCDMA) communication system. A WCDMA communication system is also referred to as a "spread spectrum communication system."

In exemplary system 100 shown in FIG. 1, input bit stream 101 contains the user's signal which includes information that is to be transmitted across the communication channel. The communication channel can be, for example, radio frequency transmission between transmit and receive antennas in a wireless communication system, including all the signal paths between multiple transmit antennas and multiple receive antennas. In this example, a transmit antenna is referred to as an input to the communication channel and a receive antenna is referred to as an output of the communication channel. A communication system in which there is more than one input or more than one output to a communication channel is also referred to as a multiple input multiple output ("MIMO") system.

Continuing with FIG. 1, input bit stream 101 is supplied to "trellis code" block 102. Trellis code block 102 performs convolutional coding, as described above, on input bit stream 101. In one embodiment trellis code block 102 performs convolutional coding with a code rate of the form (n−1)/n, also referred to as a "rate (n−1)/n trellis code." As stated above, the code rate is equal to the input rate of information being coded divided by the output rate of coded information, or equivalently the ratio of the number of bits of input to the number of bits of output. For example, in one embodiment a rate 6/7 trellis code is used, thus, there are 7 bits of output for each 6 bits of input to trellis code block 102.

Trellis code block 102 works in conjunction with QAM (quadrature amplitude modulation) block 104. The combined effect of trellis code block 102 and QAM block 104 is to convert input bit stream 101 into a sequence of modulation symbols, also referred to as a "modulation symbol sequence." Modulation symbols can be represented as signal points in a complex phase space as described in an article titled "Channel Coding with Multilevel/Phase Signals" by G. Ungerboeck, *IEEE Transactions in Information Theory*, vol. IT-28, pp 55-67, January 1982. In one embodiment, a trellis coded quadrature amplitude modulation with 128 modulation symbols, or signal points, is used. A trellis coded quadrature amplitude modulation with 128 modulation symbols is also referred to as 128-QAM. Other quadrature amplitude modulations can be used, for example, 8-QAM and 32-QAM. Moreover, other types of multilevel/phase modulations can be used, such as pulse amplitude modulation ("PAM"), phase shift keying ("PSK"), or differential phase shift keying ("DPSK"). By using different modulation schemes, that is, varying the modulation scheme during operation of the system, different data rates or throughputs can be supported at a tradeoff in reliability. For example, 8-QAM can be used to increase the error reliability of signal transmission at a given signal transmit power but at a lower data transmission rate in comparison to 128-QAM or 32-QAM, and conversely, 32-QAM can be used to increase throughput or data rate at the cost of decreased reliability in error performance for the same signal power compared to 8-QAM. The choice of modulation can be used in conjunction with choice of Walsh functions, discussed below, to further enhance the different combinations of throughput and reliability which can be achieved.

As shown in FIG. 1, the modulation symbol sequence from QAM block 104 is fed to each of Walsh covers 110, 112, 114, and 116. Walsh cover 110 is labeled "Walsh 1;" Walsh cover 112 is labeled "Walsh 2;" Walsh cover 114 is labeled "Walsh 3;" and Walsh cover 116 is labeled "Walsh 4." Each of Walsh covers 110, 112, 114, and 116 is labeled differently to indicate that a distinct Walsh function is used by each Walsh cover to achieve orthogonality of the four outputs of Walsh covers 110, 112, 114, and 116.

By way of background, in WCDMA communications, each distinct signal is spread to allow many signals to simultaneously occupy the same bandwidth without significantly interfering with one another. The signals can originate from different users, or as in the present example shown in FIG. 1, the signal can be replicated, for example, for the purpose of achieving diversity, as explained above. One means of spreading is the application of distinct "orthogonal" spreading codes or functions, such as Walsh functions, to each distinct signal. "Orthogonality" refers to lack of correlation between the spreading functions. In a given spread spectrum communication system using Walsh functions (also called Walsh code sequences), a pre-defined Walsh function matrix having n rows of n chips each is established in advance to define the different Walsh functions to be used to distinguish different distinct signals. In the present example, each distinct replica of the modulation symbol sequence is assigned a distinct Walsh function. In other words, each distinct replica of the output signal from QAM block 104 is coded by a distinct Walsh code sequence in order to separate each distinct signal from the others.

The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the presently disclosed embodiment utilizes time multiplexing of data and various principles related to "high data rate" communication systems, and the presently disclosed embodiments can be used in "high data rate" communication systems, such as that disclosed in U.S. Pat. No. 6,574,211, entitled "Method and Apparatus for High Rate Packet Data Transmission," filed on Nov. 3, 1997, and assigned to the assignee of the present invention. The disclosure in that patent application is also hereby fully incorporated by reference into the present application.

A Walsh function having n rows of n chips each is also referred to as a Walsh function matrix of order n. An example of a Walsh function matrix where n is equal to 4, i.e. a Walsh function matrix of order 4, is shown below:

$$\begin{pmatrix} 1 & 1 & 1 & 1 \\ 1 & 0 & 1 & 0 \\ 1 & 1 & 0 & 0 \\ 1 & 0 & 0 & 1 \end{pmatrix}$$

In this example, there are 4 Walsh functions, each function having 4 chips. Each Walsh function is one row in the above Walsh function matrix. For example, the second row of the Walsh function matrix is the Walsh function having the sequence 1, 0, 1, 0. It is seen that each Walsh function, i.e. each row in the above matrix, has zero correlation with any other row in the matrix. Stated differently, exactly half of the chips in every Walsh function differ from those in every other Walsh function in the matrix.

Application of distinct orthogonal spreading functions, such as Walsh functions, to each distinct signal results in a transformation of each modulation symbol in each distinct signal into a respective spread sequence of output chips, where each spread sequence of output chips is orthogonal with every other spread sequence of output chips. Using Walsh functions, the transformation can be performed by XOR'ing each modulation symbol in each distinct signal with a sequence of chips in a particular Walsh function. Using the second Walsh function in the above example, i.e. the second row of the matrix, and XOR'ing a modulation symbol of "a" with the second row of the matrix results in the spread sequence of output chips: $\bar{a}$, a, $\bar{a}$, a, where "$\bar{a}$" denotes the binary complement of a. Thus, in this illustrative example, each modulation symbol is spread into a spread sequence of output chips having a length of 4. The number of output chips produced for each input modulation symbol is called the spreading factor; in this illustrative example, the spreading factor is 4. In practice, Walsh functions of length 2 to 512 (i.e. Walsh functions having from 2 to 512 chips in each Walsh code sequence) are used. Thus, spreading factors may range from 2 to 512 in practice.

Output 120 of Walsh cover 110, output 122 of Walsh cover 112, output 124 of Walsh cover 114, and output 126 of Walsh cover 116 are, thus, spread sequences of output chips which are mutually orthogonal. Each of outputs 120, 122, 124, and 126 is input separately to the communication channel. For example, each spread sequence of output chips can be passed on to an FIR ("finite duration impulse response") filter used for pulse shaping signals prior to their transmission using a separate antenna for each signal input into the communication channel. A receiver or receivers at the output of the communication channel, which may use a single antenna or multiple antennas, receives the signals. For example, the received signals can be passed through a receive FIR filter and then to a Walsh de-cover. The Walsh de-cover de-spreads the distinct spread sequences of output chips—i.e., undoes the Walsh function spreading—by applying the distinct inverse functions of the original distinct Walsh function spreadings. Returning to the example used above (which has a spreading factor of 4), the second row of the matrix, 1, 0, 1, 0, is again XOR'ed to the sequence of output chips, $\bar{a}$, a, $\bar{a}$, a, to produce the data symbol sequence a, a, a, a, and thus the de-spread data symbol is "a," the original input data symbol. Thus, the original modulation symbol sequence can be recovered.

The modulation symbol sequence is input to a maximum likelihood decoder, which can be, for example, a Viterbi decoder. Due to imperfections in the communication channel, the received modulation symbol sequence may not be exactly identical to the original modulation symbol sequence that was input to the communication channel. Simply stated, maximum likelihood detection determines a valid modulation symbol sequence that is most likely to have produced the modulation symbol sequence that is received by the maximum likelihood decoder. Thus, given a modulation symbol sequence, the maximum likelihood decoder determines a "best estimate" of the original modulation symbol sequence and decodes the best estimate into an output information sequence. Because the best estimate is used, the output information sequence contains a minimal number of errors in comparison to the original information transmitted.

Thus, FIG. 1 shows one example of a system that can be used to provide greater reliability of communications through use of orthogonal transmit diversity in a multiple input multiple output communication channel.

Figure 2:
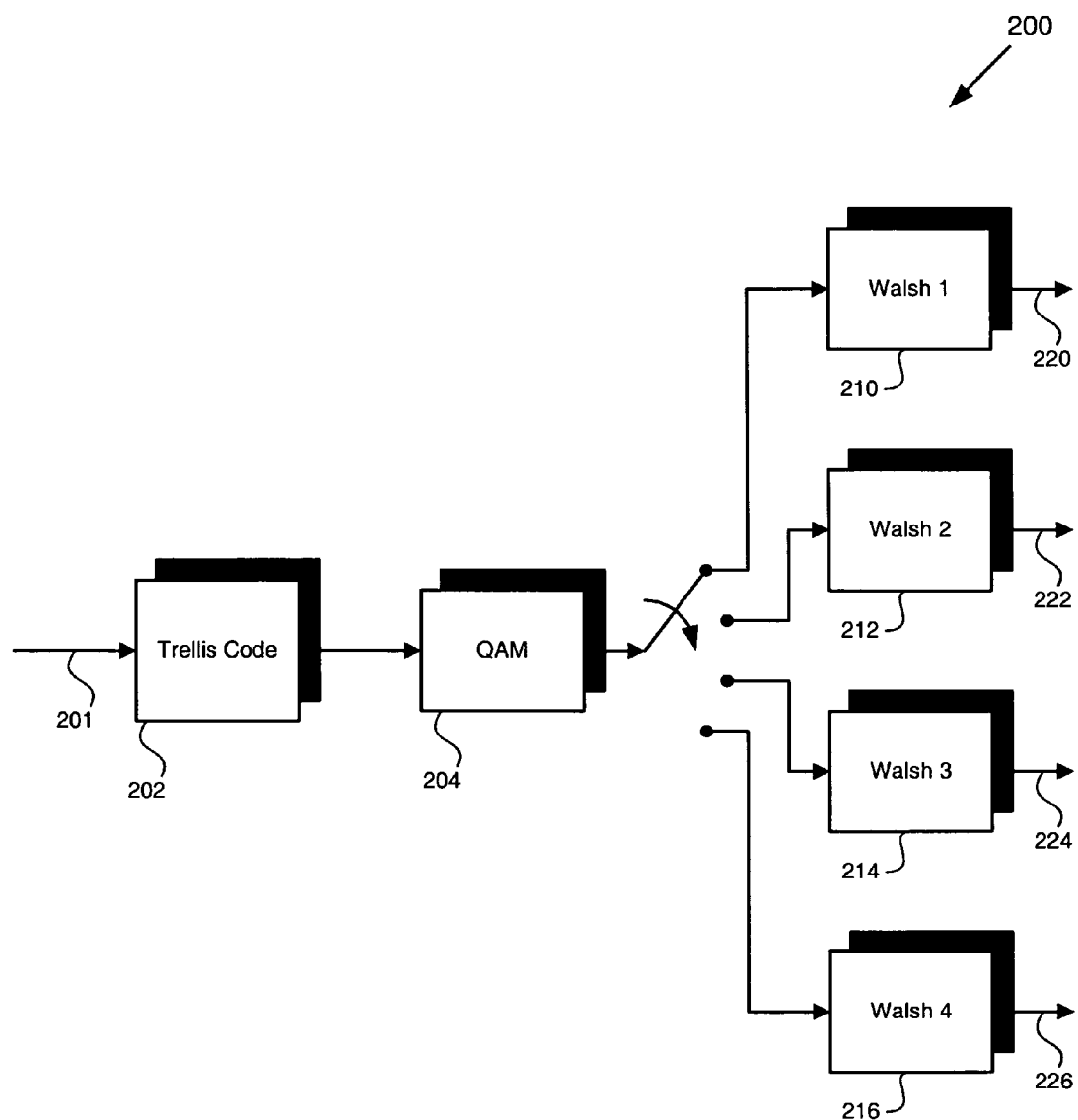
FIG. 2 illustrates, in block diagram form, an example of communication channel multiple input orthogonality for another embodiment of the present invention in an exemplary communication system.

FIG. 2 illustrates an example of orthogonality of multiple inputs to a communication channel in accordance with another embodiment. Exemplary system 200 shown in FIG. 2 constitutes part of a transmitter which may generally reside in a base station, gateway, or satellite repeater when communication is taking place in a forward channel. Exemplary system 200 can be part of a base station transmitter, for example, in a WCDMA communication system or spread spectrum communication system.

In exemplary system 200 shown in FIG. 2, input bit stream 201 contains the signal of one or more users. The signal includes information that is to be transmitted across the communication channel. The communication channel can be, for example, radio frequency transmission between transmit and receive antennas in a wireless communication system comprising a multiple input multiple output, or MIMO, channel as described above.

Continuing with FIG. 2, input bit stream 201 is supplied to "trellis code" block 202. Trellis code block 202 performs convolutional coding, as described above, on input bit stream 201. In one embodiment described here, trellis code block 202 performs rate (n−1)/n trellis coding on input bit stream 201. For example, in one embodiment a rate 6/7 trellis code is used.

Trellis code block 202 works in conjunction with QAM block 204. The combined effect of trellis code block 202 and QAM block 204 is to convert input bit stream 201 into a modulation symbol sequence, in which modulation symbols can be represented as signal points in a complex phase space as stated above. In one embodiment, a trellis coded quadrature amplitude modulation with 128 modulation symbols, or 128-QAM, is used. As discussed above, other modulations can be used, and in conjunction with different Walsh functions, multiple combinations of throughput and reliability can be supported.

As shown in FIG. 2, a portion of the modulation symbol sequence from QAM block 204 is fed to each of Walsh covers 210, 212, 214, and 216 in turn, by time demultiplexing the modulation symbol sequence. That is, a separate modulation symbol sequence is simultaneously fed to each of Walsh covers 210, 212, 214, and 216. Because the capacity of the communication channel is still the same as for the example of FIG. 1, each separate Walsh cover can still input spread sequences to the communication channel at the same rate. To compensate for the increased amount of information being fed to the communication channel, the output rate of trellis code block 202 and QAM block 204 is increased, or "speeds up," by a factor of four to feed each separate Walsh cover its distinct modulation symbol sequence. Thus, the maximum information throughput rate in the example of FIG. 2 is increased by a factor of four over that in the example of FIG. 1. There is a corresponding loss, however, of diversity in the example of FIG. 2 compared to the example of FIG. 1 where four replicas of the modulation symbol sequence are simultaneously transmitted over the communication channel. In other words, some of the increased reliability in the example of FIG. 1 is traded for increased information throughput, or data rate, in the example of FIG. 2.

Walsh cover 210 is labeled "Walsh 1;" Walsh cover 212 is labeled "Walsh 2;" Walsh cover 214 is labeled "Walsh 3;" and Walsh cover 216 is labeled "Walsh 4." Each of Walsh covers 210, 212, 214, and 216 is labeled differently to indicate that a distinct Walsh function is used by each Walsh cover to achieve orthogonality of the four outputs of Walsh covers 210, 212, 214, and 216. Output 220 of Walsh cover 210, output 222 of Walsh cover 212, output 224 of Walsh cover 214, and output 226 of Walsh cover 216 are, thus, spread sequences of output chips which are mutually orthogonal. Each of outputs 220, 222, 224, and 226 is input separately to the communication channel. For example, each spread sequence of output chips can be passed on to an FIR filter used for pulse shaping signals prior to their transmission using a separate antenna for each signal input into the communication channel. A receiver or receivers at the output of the communication channel, which may use a single antenna or multiple antennas, receives the signals, passes the signals through receive FIR filters, Walsh de-covers the signals, and decodes the modulation symbol sequence using maximum likelihood decoding as described above.

Thus, FIG. 2 shows an example of a system that can be used to provide greater reliability of communications and increased data rate, with a trade off between increased reliability and increased data rate, through use of orthogonal transmit diversity in a multiple input multiple output communication channel.

Figure 3:
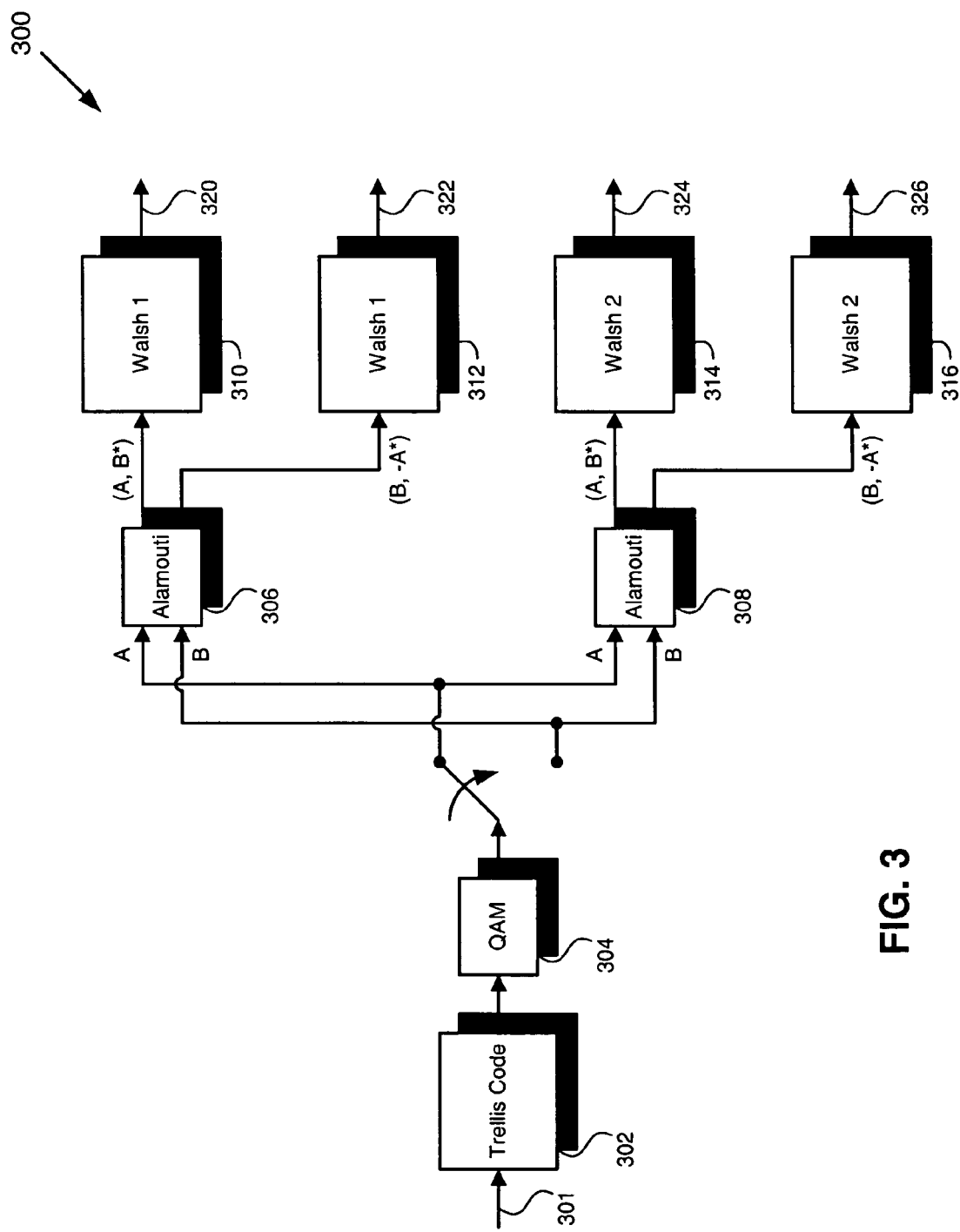
FIG. 3 illustrates in block diagram form, one example of communication channel multiple input orthogonality with Alamouti transmit diversity for one embodiment of the present invention in an exemplary communication system.

FIG. 3 illustrates an example of orthogonality with Alamouti transmit diversity of multiple inputs to a communication channel in accordance with one embodiment. Exemplary system 300 shown in FIG. 3 constitutes part of a transmitter which may generally reside in a base station, gateway, or satellite repeater when communication is taking place in a forward channel. Exemplary system 300 can be part of a base station transmitter, for example, in a WCDMA communication system or spread spectrum communication system.

In exemplary system 300 shown in FIG. 3, input bit stream 301 contains the user's signal which includes information that is to be transmitted across the communication channel. The communication channel can be, for example, radio frequency transmission between transmit and receive antennas in a wireless communication system comprising a multiple input multiple output, or MIMO, channel as described above.

Continuing with FIG. 3, input bit stream 301 is supplied to "trellis code" block 302. Trellis code block 302 performs convolutional coding, as described above, on input bit stream 301. In one embodiment described here, trellis code block 302 performs rate (n−1)/n trellis coding on input bit stream 301. For example, in one embodiment a rate 6/7 trellis code is used.

Trellis code block 302 works in conjunction with QAM block 304. The combined effect of trellis code block 302 and QAM block 304 is to convert input bit stream 301 into a modulation symbol sequence, in which modulation symbols can be represented as signal points in a complex phase space as stated above. In one embodiment, a trellis coded quadrature amplitude modulation with 128 modulation symbols, or 128-QAM, is used. As discussed above, other modulations can be used, and in conjunction with different Walsh functions, multiple combinations of throughput and reliability can be supported.

As shown in FIG. 3, the modulation symbol sequence from QAM block 304 is provided to each of Alamouti blocks 306 and 308. The input and output of each of Alamouti blocks 306 and 308 is identical. As indicated in FIG. 3, the modulation symbol sequence from QAM block 304 is alternately passed to the "A" inputs of Alamouti blocks 306 and 308 and then to the "B" inputs of Alamouti blocks 306 and 308. Thus, the modulation symbol sequence from QAM block 304 is effectively grouped into input groups of symbols, each input group containing 2 symbols, referred to in the present example as an "A symbol" and a "B symbol." Each of Alamouti blocks 306 and 308 has a first and a second output. For each input group of modulation symbols, the first output of each of Alamouti blocks 306 and 308 is the A symbol followed in sequence by the complex conjugate of the B symbol, indicated in FIG. 3 by the notation "(A, B*)." Recall that each modulation symbol is represented as a signal point in complex phase space, i.e. as a complex number. For each input group of modulation symbols, the second output of each of Alamouti blocks 306 and 308 is the B symbol followed in sequence by the negative complex conjugate of the A symbol, indicated in FIG. 3 by the notation "(B, −A*)." The theoretical justification and advantages of this scheme are described in an article titled "A Simple Transmit Diversity Technique for Wireless Communications" by S. M. Alamouti, *IEEE Journal on Select Areas in Communications*, vol. 16, no. 8, pp 1451-58, October 1998. The scheme of diversity encoding described in the present example is referred to as space time encoding. As described in the article referenced here, space frequency encoding can also be used in the present example, as is apparent to a person of ordinary skill in the art. The first output of Alamouti block 306 is fed to Walsh cover 310. The second output of Alamouti block 306 is fed to Walsh cover 312. The first output of Alamouti block 308 is fed to Walsh cover 314. The second output of Alamouti block 308 is fed to Walsh cover 316.

Walsh cover 310 is labeled "Walsh 1;" Walsh cover 312 is also labeled "Walsh 1;" Walsh cover 314 is labeled "Walsh 2;" and Walsh cover 316 is also labeled "Walsh 2." Each of Walsh covers 310 and 312, is labeled identically, "Walsh 1," to indicate that the same Walsh function is used to spread both outputs of Alamouti block 306. Similarly, each of Walsh covers 314 and 316, is labeled identically, "Walsh 2," to indicate that the same Walsh function is used to spread both outputs of Alamouti block 308. In other words, both Walsh covers in each pair of Walsh covers use the same Walsh function. Walsh covers 310 and 312 are labeled differently from Walsh covers 314 and 316 to indicate that distinct Walsh functions are used by each pair of Walsh covers to achieve pairwise mutual orthogonality of the four outputs of Walsh covers 310, 312, 314, and 316. In other words, pairwise mutual orthogonality refers to the condition that each pair of Walsh covers is orthogonal with every other pair of Walsh covers. Output 320 of Walsh cover 310, output 322 of Walsh cover 312, output 324 of Walsh cover 314, and output 326 of Walsh cover 316 are, thus, spread sequences of output chips for which the pair of outputs 320 and 322 are orthogonal to the pair of outputs 324 and 326. Each of outputs 320, 322, 324, and 326 is input separately to the communication channel. For example, each spread sequence of output chips can be passed on to an FIR filter used for pulse shaping signals prior to their transmission using a separate antenna for each signal input into the communication channel. A receiver or receivers at the output of the communication channel, which may use a single antenna or multiple antennas, receives the signals, passes the signals through receive FIR filters, Walsh de-covers the signals, and decodes the modulation symbol sequence using maximum likelihood decoding as described above.

The maximum information throughput rate in the example of FIG. 3 is increased by a factor of two over that in the example of FIG. 1. Moreover, due to the use of Alamouti diversity encoding in the example of FIG. 3, there is an improvement in diversity compared to the example of FIG. 2. Thus, FIG. 3 shows an example of a system that can be used to provide greater reliability of communications and increased data rate, with a trade off between increased reliability and increased data rate, through use of orthogonal transmit diversity in a multiple input multiple output communication channel.

Figure 4:
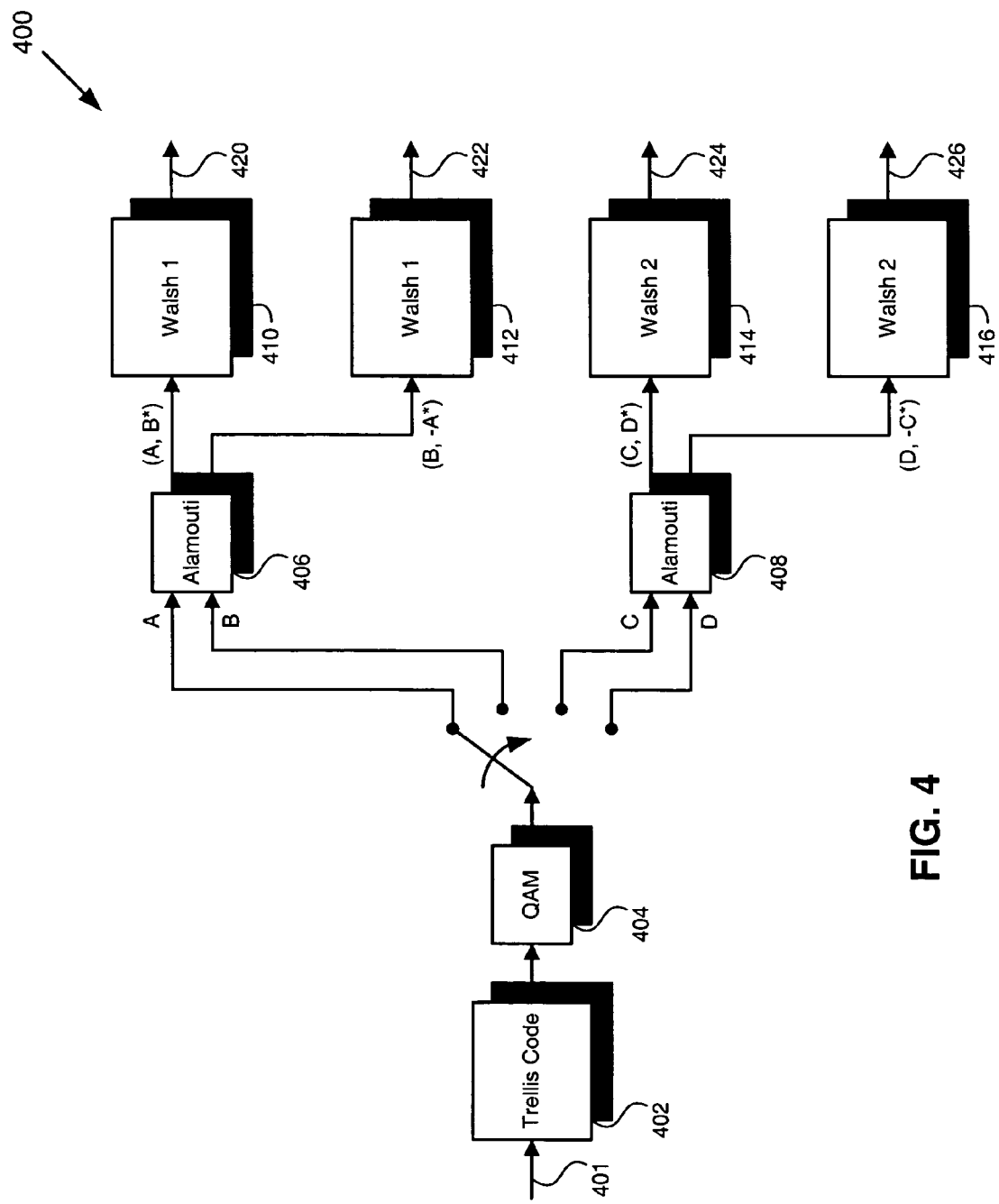
FIG. 4 illustrates, in block diagram form, an example of communication channel multiple input orthogonality with Alamouti transmit diversity for another embodiment of the present invention in an exemplary communication system.

FIG. 4 illustrates an example of orthogonality with Alamouti transmit diversity of multiple inputs to a communication channel in accordance with another embodiment. Exemplary system 400 shown in FIG. 4 constitutes part of a transmitter which may generally reside in a base station, gateway, or satellite repeater when communication is taking place in a forward channel. Exemplary system 400 can be part of a base station transmitter, for example, in a WCDMA communication system or spread spectrum communication system.

In exemplary system 400 shown in FIG. 4, input bit stream 401 contains the signal of one or more users which includes information that is to be transmitted across the communication channel. The communication channel can be, for example, radio frequency transmission between transmit and receive antennas in a wireless communication system comprising a multiple input multiple output, or MIMO, channel as described above.

Continuing with FIG. 4, input bit stream 401 is supplied to "trellis code" block 402. Trellis code block 402 performs convolutional coding, as described above, on input bit stream 401. In one embodiment described here, trellis code block 402 performs rate (n−1)/n trellis coding on input bit stream 401. For example, in one embodiment a rate 6/7 trellis code is used.

Trellis code block 402 works in conjunction with QAM block 404. The combined effect of trellis code block 402 and QAM block 404 is to convert input bit stream 401 into a modulation symbol sequence, in which modulation symbols can be represented as signal points in a complex phase space as stated above. In one embodiment, a trellis coded quadrature amplitude modulation with 128 modulation symbols, or 128-QAM, is used. As discussed above, other modulations can be used, and in conjunction with different Walsh functions, multiple combinations of throughput and reliability can be supported.

As shown in FIG. 4, a portion of the modulation symbol sequence from QAM block 404 is fed to each of Alamouti blocks 406 and 408 in turn, by time demultiplexing the modulation symbol sequence. That is, a separate modulation symbol sequence is simultaneously fed to each input of each of Alamouti blocks 406 and 408. As indicated in FIG. 4, the modulation symbol sequence from QAM block 404 is alternately passed to the "A" and "B" inputs of Alamouti block 406 and then to the "C" and "D" inputs of Alamouti block 408. Thus, the modulation symbol sequence from QAM block 404 is effectively grouped into input groups of symbols, each input group containing 4 symbols, referred to in the present example as an "A symbol," a "B symbol," a "C symbol," and a "D symbol."

Each of Alamouti blocks 406 and 408 has a first and a second output. For each input group of modulation symbols, the first output of Alamouti block 406 is the A symbol followed in sequence by the complex conjugate of the B symbol, indicated in FIG. 4 by the notation "(A, B*)." Recall that each modulation symbol is represented as a signal point in complex phase space, i.e. as a complex number. For each input group of modulation symbols, the second output of Alamouti block 406 is the B symbol followed in sequence by the negative complex conjugate of the A symbol, indicated in FIG. 4 by the notation "(B, −A*)." For each input group of modulation symbols, the first output of Alamouti block 408 is the C symbol followed in sequence by the complex conjugate of the D symbol, indicated in FIG. 4 by the notation "(C, D*)." For each input group of modulation symbols, the second output of Alamouti block 408 is the D symbol followed in sequence by the negative complex conjugate of the C symbol, indicated in FIG. 4 by the notation "(D, −C*)." The scheme of diversity encoding described in the present example is thus a variant of the space time encoding described in the above-referenced article by S. M. Alamouti. As described in the above-referenced article, space frequency encoding can also be used in the present example, as is apparent to a person of ordinary skill in the art. The first output of Alamouti block 406 is fed to Walsh cover 410. The second output of Alamouti block 406 is fed to Walsh cover 412. The first output of Alamouti block 408 is fed to Walsh cover 414. The second output of Alamouti block 408 is fed to Walsh cover 416.

Walsh cover 410 is labeled "Walsh 1;" Walsh cover 412 is also labeled "Walsh 1;" Walsh cover 414 is labeled "Walsh 2;" and Walsh cover 416 is also labeled "Walsh 2." Each of Walsh covers 410 and 412, is labeled identically, "Walsh 1," to indicate that the same Walsh function is used to spread both outputs of Alamouti block 406. Similarly, each of Walsh covers 414 and 416, is labeled identically, "Walsh 2," to indicate that the same Walsh function is used to spread both outputs of Alamouti block 408. Walsh covers 410 and 412 are labeled differently from Walsh covers 414 and 416 to indicate that distinct Walsh functions are used by each pair of Walsh covers to achieve pairwise orthogonality of the four outputs of Walsh covers 410, 412, 414, and 416. Output 420 of Walsh cover 410, output 422 of Walsh cover 412, output 424 of Walsh cover 414, and output 426 of Walsh cover 416 are, thus, spread sequences of output chips for which the pair of outputs 420 and 422 are orthogonal to the pair of outputs 424 and 426. Each of outputs 420, 422, 424, and 426 is input separately to the communication channel. For example, each spread sequence of output chips can be passed on to an FIR filter used for pulse shaping signals prior to their transmission using a separate antenna for each signal input into the communication channel. A receiver or receivers at the output of the communication channel, which may use a single antenna or multiple antennas, receives the signals, passes the signals through receive FIR filters, Walsh de-covers the signals, and decodes the modulation symbol sequence using maximum likelihood decoding as described above.

The maximum information throughput rate in the example of FIG. 4 is increased by a factor of two over that in the example of FIG. 3. Thus, the information throughput rate in the example of FIG. 4 is the equal of the information throughput rate in the example of FIG. 2. Moreover, due to the use of Alamouti diversity encoding in the example of FIG. 4, there is an improvement in diversity compared to the example of FIG. 2. Thus, FIG. 4 shows an example of a system that can be used to provide greater reliability of communications and increased data rate, with a trade off between increased reliability and increased data rate, through use of orthogonal transmit diversity in a multiple input multiple output communication channel.

Figure 5:
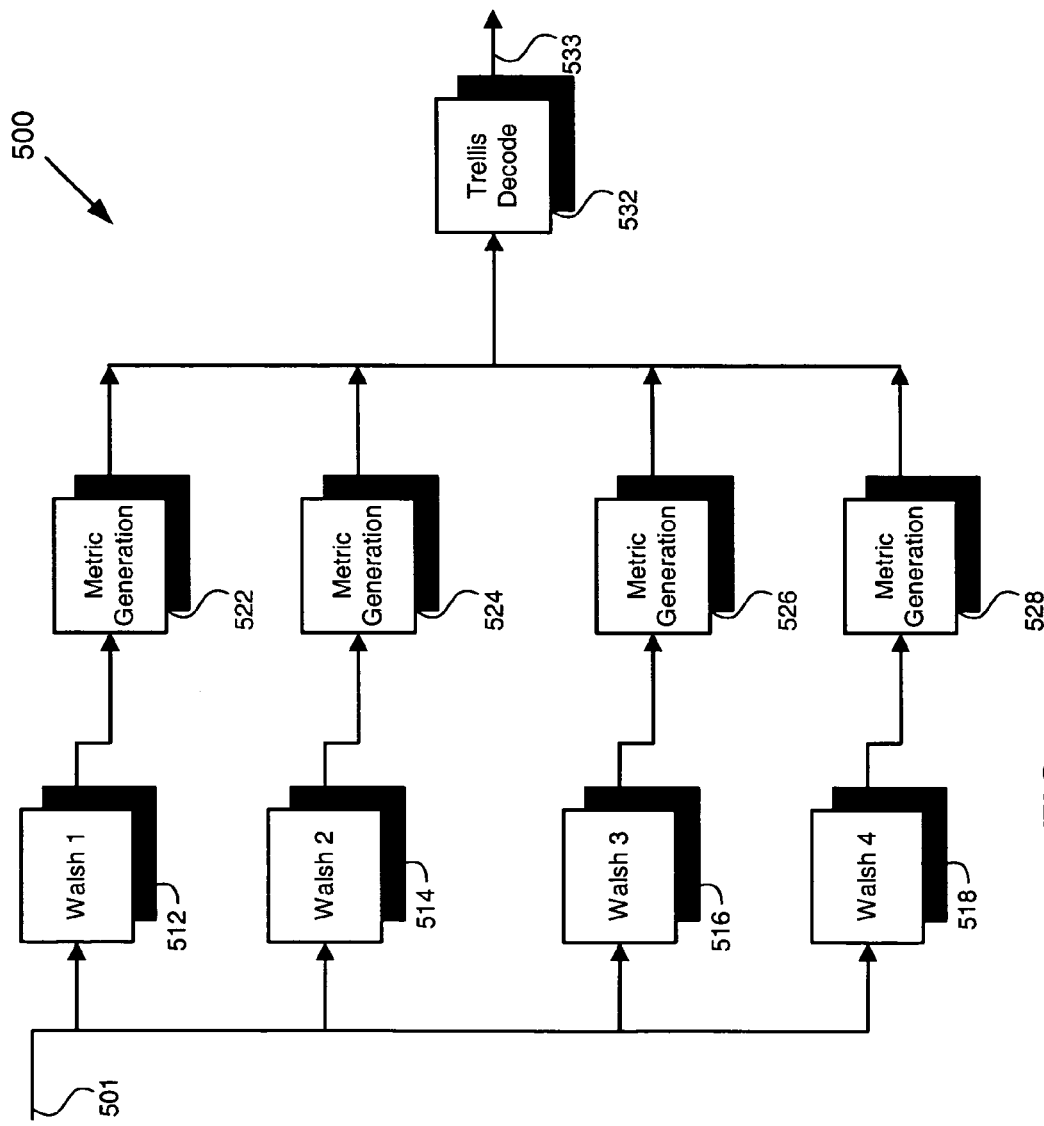
FIG. 5 illustrates, in block diagram form, an example of receiver processing for use in conjunction with the examples of multiple input orthogonality given in either of FIG. 1 or 2.

FIG. 5 illustrates an example of receiver processing in accordance with one embodiment. Exemplary system 500 shown in FIG. 5 constitutes part of a receiver which may generally reside in a subscriber unit or mobile unit when communication is taking place in a forward channel. Exemplary system 500 can be part of a subscriber unit receiver, for example, in a WCDMA communication system or spread spectrum communication system.

In exemplary system 500 shown in FIG. 5, input signal 501 is received from a communication channel with 4 inputs. The communication channel can be, for example, radio frequency transmission between multiple transmit and receive antennas in a wireless communication system comprising a multiple input multiple output, or MIMO, channel as described above. For a channel with 4 receive antennas, for example, a "copy" of exemplary system 500 would be present for each separate receive antenna.

Continuing with FIG. 5, the receive processing shown in FIG. 5 is intended to be used with either of the transmit processes used in FIG. 1 or FIG. 2. Thus, input signal 501 comprises a composite signal which has been Walsh covered by each of Walsh 1, Walsh 2, Walsh 3, and Walsh 4 of either FIG. 1 or FIG. 2. Input signal 501 is passed to each of Walsh decovers 512, 514, 516, and 518.

Walsh decover 512 is labeled "Walsh 1;" Walsh decover 514 is labeled "Walsh 2;" Walsh decover 516 is labeled "Walsh 3;" and Walsh decover 518 labeled "Walsh 4." Each of Walsh decovers 512, 514, 516, and 518 is labeled so as to indicate that the same distinct Walsh function is used by each Walsh decover to decover the corresponding transmit signal from FIG. 1 or FIG. 2. Thus, the four outputs of Walsh decovers 512, 514, 516, and 518 correspond to 4 replicas of the single modulation symbol sequence that was transmitted in the case of FIG. 1, or alternatively, to 4 distinct modulation symbol sequences that were transmitted in the case of FIG. 2. The replica or distinct modulation symbol sequence output by Walsh decover 512 is passed to metric generation block 522, the output of Walsh decover 514 is passed to metric generation block 524, and so forth as indicated in FIG. 5.

Each of metric generation blocks 522, 524, 526, and 528 performs metric generation, also referred to as "path metric" generation or "branch metric" generation, for input to a trellis decoder, which can be a Viterbi decoder, for example. For example, each of metric generation blocks 522, 524, 526, and 528 can multiply each output of the Walsh decover operation by the complex conjugate of each possible transmitted modulation symbol, then multiply by the complex conjugate of the estimated complex path gain, take twice the real part of the result, and subtract a bias term, comprising the square of the magnitude of the path gain of the channel times the square of the magnitude of the possible transmitted modulation symbol, to produce a metric value for input to the trellis decoder. As shown in FIG. 5, the metric values output by metric generation blocks 522, 524, 526, and 528 are all fed into trellis decode block 532. Output 533 of trellis decode block 532 is a maximum likelihood estimate, as discussed above, of the original input bit stream of one or more users, that is, input bit stream 101 in the case of FIG. 1 or input bit stream 201 in the case of FIG. 2. Thus, FIG. 5 shows an example of receiver processing for utilization of signal orthogonality in a multiple input multiple output communication channel.

Figure 6:
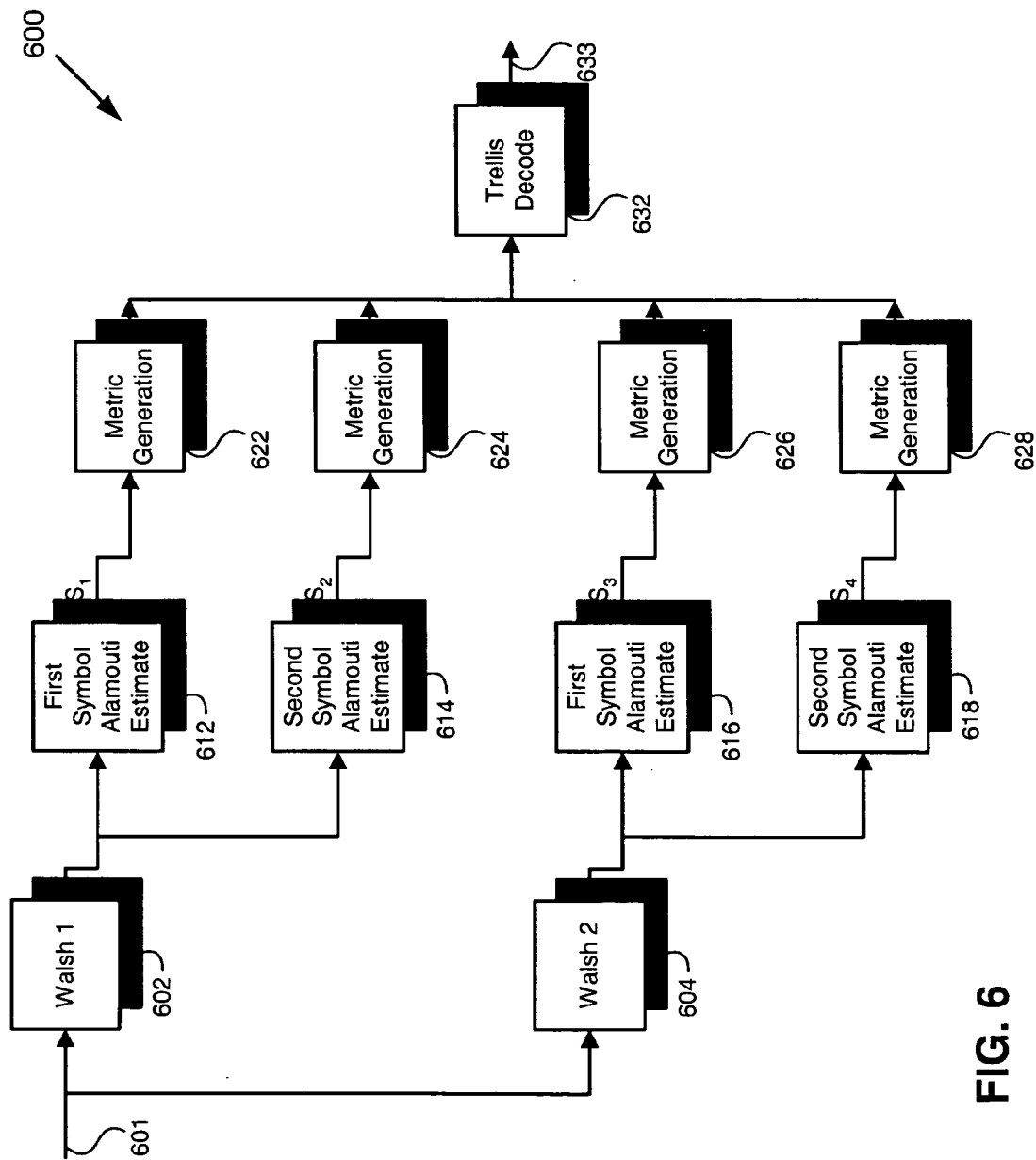
FIG. 6 illustrates, in block diagram form, an example of receiver processing for use in conjunction with the examples of multiple input orthogonality with Alamouti transmit diversity given in either of FIG. 3 or 4.

FIG. 6 illustrates an example of receiver processing in accordance with one embodiment. Exemplary system 600 shown in FIG. 6 constitutes part of a receiver which may generally reside in a subscriber unit or mobile unit when communication is taking place in a forward channel. Exemplary system 600 can be part of a subscriber unit receiver, for example, in a WCDMA communication system or spread spectrum communication system.

In exemplary system 600 shown in FIG. 6, input signal 601 is received from a communication channel with 4 inputs. The communication channel can be, for example, radio frequency transmission between multiple transmit and receive antennas in a wireless communication system comprising a multiple input multiple output, or MIMO, channel as described above. For a channel with 4 receive antennas, for example, a "copy" of exemplary system 600 would be present for each separate receive antenna.

Continuing with FIG. 6, the receive processing shown in FIG. 6 is intended to be used with either of the transmit processes used in FIG. 3 or FIG. 4. Thus, input signal 601 comprises a composite signal which has been Walsh covered by each of Walsh 1, and Walsh 2 of either FIG. 3 or FIG. 4. Input signal 601 is passed to each of Walsh decovers 602 and 604.

Walsh decover 602 is labeled "Walsh 1," and Walsh decover 604 is labeled "Walsh 2." Each of Walsh decovers 602 and 604 is labeled so as to indicate that the same distinct Walsh function is used by each Walsh decover to decover the corresponding transmit signal from FIG. 3 or FIG. 4. Thus, the two outputs of Walsh decovers 602 and 604 correspond to a received symbol pair from which each symbol of the received symbol pair can be estimated using the Alamouti technique referenced above.

By way of brief illustration, the symbol pair (A, B*) shown in FIG. 3 can be transmitted with a channel path gain of $h_1$ so that the pair "becomes" $(h_1A, h_1B^*)$ and the symbol pair (B, −A*) shown in FIG. 3 can be transmitted with a channel path gain of $h_2$ so that the pair "becomes" $(h_2B, -h_2A^*)$. During the first time interval a certain amount of noise n(1) from the channel gets added to the received signal in the first time interval, referred to as r(1). The received signal in the first time interval is then:

$$r(1) = h_1A + h_2B + n(1).$$

During the second time interval a certain amount of noise n(2) from the channel gets added to the received signal in the second time interval, referred to as r(2). The received signal in the second time interval is then:

$$r(2) = h_1B^* - h_2A^* + n(2).$$

With the aid of signal delay elements, for example, to make the values of r(1) and r(2) available at the same point in time, the blocks marked "first symbol Alamouti estimate" perform the following algebraic operations on r(1) and r(2).

First symbol estimate=$h_1^*r(1) - h_2r^*(2)$.

Similarly, the blocks marked "second symbol Alamouti estimate" perform the following algebraic operations on r(1) and r(2).

Second symbol estimate=$h_2^*r(1) + h_1r^*(2)$.

It can be shown using the algebra of complex numbers that:

First symbol estimate=$(|h_1|^2 + |h_2|^2)A + h_1^*n(1) + h_2n(2)$, and

Second symbol estimate=$(|h_1|^2 + |h_2|^2)B + h_2^*n(1) + h_1n(2)$.

Thus, "first symbol estimate" is an estimate of the symbol "A" and "second symbol estimate" is an estimate of the symbol "B." Each estimate contains a bias, $(|h_1|^2 + |h_2|^2)$, which can be offset by metric generation blocks 622, 624, 626, and 628.

In the case where the transmit process of FIG. 3 is used, both Walsh 1 and Walsh 2 cover the symbol pair A, B. Thus, output symbol $S_1$ of first symbol Alamouti estimate block 612 shown in FIG. 6 is an estimate of symbol "A;" output symbol $S_2$ of second symbol Alamouti estimate block 614 is an estimate of symbol "B;" output symbol $S_3$ is an estimate of symbol "A;" and output symbol $S_4$ is an estimate of symbol "B," in the case of FIG. 3.

In the case where the transmit process of FIG. 4 is used, Walsh 1 covers the symbol pair A, B and Walsh 2 covers the symbol pair C, D. Thus, output symbol $S_1$ of first symbol Alamouti estimate block 612 shown in FIG. 6 is an estimate of symbol "A;" output symbol $S_2$ of second symbol Alamouti estimate block 614 is an estimate of symbol "B;" output symbol $S_3$ of first symbol Alamouti estimate block 616 is an estimate of symbol "C;" and output symbol $S_4$ of second symbol Alamouti estimate block 618 is an estimate of symbol "D," in the case of FIG. 4.

The symbol estimates are passed to each of metric generation blocks 622, 624, 626, and 628 respectively as indicated in FIG. 6. Each of metric generation blocks 622, 624, 626, and 628 performs metric generation, also referred to as "path metric" generation or "branch metric" generation, for input to a trellis decoder, which can be a Viterbi decoder, for example. For example, each of metric generation blocks 622, 624, 626, and 628 can multiply each modulation symbol estimate in the sequence of symbol estimates generated by each of the Alamouti estimate blocks by the complex conjugate of each possible transmitted modulation symbol, take twice the real part of the result, and subtract a bias term, comprising $(|h_1|^2 + |h_2|^2)$ times the square of the magnitude of the possible transmitted modulation symbol, to produce a metric value for input to the trellis decoder. As shown in FIG. 6, the metric values output by metric generation blocks 622, 624, 626, and 628 are all fed into trellis decode block 632. Output 633 of trellis decode block 632 is a maximum likelihood estimate, as discussed above, of either the original user input bit stream in the case of FIG. 3 or multiple users' input bit streams in the case of FIG. 4. Thus, FIG. 6 shows an example of receiver processing for utilization of signal orthogonality with Alamouti transmit diversity in a multiple input multiple output communication channel.

Figure 7:
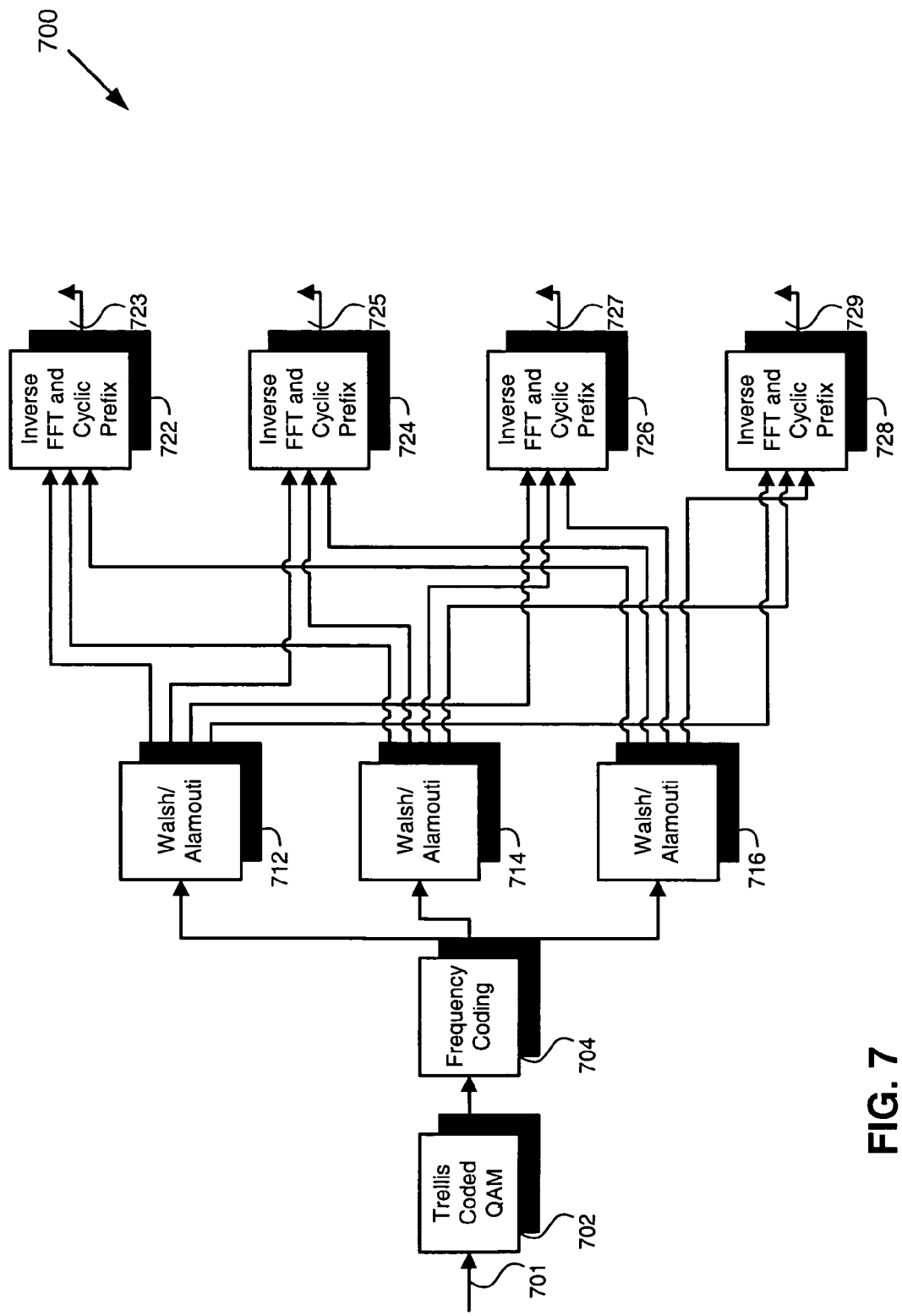
FIG. 7 illustrates, in block diagram form, an example of communication channel multiple input orthogonality and diversity using orthogonal frequency division multiplexing for one embodiment of the present invention in an exemplary communication system.

FIG. 7 shows an example of how OFDM can be used in one embodiment. Exemplary system 700 shown in FIG. 7 constitutes part of a transmitter which may generally reside in a base station, gateway, or satellite repeater when communication is taking place in a forward channel. Exemplary system 700 can be part of a base station transmitter, for example, in a WCDMA communication system or spread spectrum communication system.

In exemplary system 700 shown in FIG. 7, input bit stream 701 contains the signal of one or more users. The signal includes information that is to be transmitted across the communication channel. The communication channel can be, for example, radio frequency transmission between transmit and receive antennas in a wireless communication system comprising a multiple input multiple output, or MIMO, channel as described above. As shown in FIG. 7, input bit stream 701 is supplied to "trellis coded QAM" block 702. Trellis coded QAM block 202 performs convolutional coding and quadrature amplitude modulation, as described above in relation to FIGS. 1 and 2, on input bit stream 701.

Continuing with FIG. 7, the modulation symbol sequence from trellis coded QAM block 202 is fed to "frequency coding" block 704. Frequency coding block 704 feeds the modulation symbol sequence to each of Walsh/Alamouti blocks 712, 714, and 716 by time demultiplexing the modulation symbol sequence. That is, a portion of the modulation symbol sequence is simultaneously fed to each of Walsh/Alamouti blocks 712, 714, and 716 at a separate distinct frequency for each Walsh/Alamouti block. Each distinct separate frequency is also referred to as a "frequency bin." The example shown in FIG. 7 uses only 3 separate frequencies or frequency bins for the sake of simplicity and brevity in the present illustrative example. Thus, the example of FIG. 7 shows only 3 Walsh/Alamouti blocks, one for each frequency bin. In practice any desired number of frequency bins can be used based on practical considerations. The number of Walsh/Alamouti blocks can be adjusted accordingly, as is apparent to a person of ordinary skill in the art.

Moreover, the present example is based on straightforward demultiplexing of the modulation symbol sequence. That is, a symbol from the modulation symbol sequence is coded into the first frequency bin, the subsequent symbol is coded into the second frequency bin, the next subsequent symbol is coded into the third frequency bin, and the next subsequent symbol is coded once again into the first frequency bin, and so forth for each subsequent symbol. Many variations on this scheme are possible, for example, a replica of the entire modulation symbol sequence can be coded into each frequency bin. Any of a number of other techniques known in the art can also be used, such as symbol repetition and symbol interleaving, for example. The details of implementing these techniques are apparent to a person of ordinary skill in the art, and are therefore not presented here.

Continuing with FIG. 7, each of Walsh/Alamouti blocks performs the processing subsequent to trellis coded modulation as described above in connection with any of FIGS. 1 through 4. For example, if the processing of FIG. 4 were chosen for each of Walsh/Alamouti blocks 712, 714, and 716, then each of Walsh/Alamouti blocks 712, 714, and 716 performs the processing indicated in FIG. 4 for Alamouti blocks 406 and 408, and Walsh covers 410, 412, 414, and 416. For example, in the case of Walsh/Alamouti block 712, the modulation symbol sequence that is input to Walsh/Alamouti block 712 is first demultiplexed into two Alamouti blocks corresponding to Alamouti block 406 and Alamouti block 408 of FIG. 4. The output of Walsh/Alamouti block 712 is, thus, the output of 4 Walsh covers corresponding to Walsh covers 410, 412, 414, and 416. Thus, the output of Walsh/Alamouti block 712 is 4 pairwise orthogonal spread sequences of output chips as described above in relation to FIG. 4. Thus, the orthogonal transmit diversity technique, in any of the forms described above, is applied to the modulation symbol sequence for each frequency bin.

The four outputs of each of Walsh/Alamouti blocks 712, 714, and 716 are fed to each of "inverse FFT and cyclic prefix" blocks 722, 724, 726, and 728. That is, each of the four inverse FFT and cyclic prefix blocks 722, 724, 726, and 728 has 3 distinct spread sequences of output chips, one for each frequency bin, as input. The present example, as with the examples of FIGS. 1 through 4, assumes that four separate antennas are used as inputs to the multiple input multiple output communication channel. It is manifest that any practical number of inputs to the multiple input multiple output channel can be used. For example, a channel with 8 inputs would require 8 inverse FFT and cyclic prefix blocks, and each Walsh/Alamouti block would be required to provide 8 outputs. The required changes to the examples given are apparent to a person of ordinary skill in the art. Thus, each inverse FFT and cyclic prefix block performs inverse FFT processing on the output of all of the frequency bins, i.e. the spread sequences of output chips. The inverse FFT operation is performed once for each chip period of the spread sequences of output chips. The cyclic prefix is a technique, known in the art, which adds a certain amount of known samples to the inverse FFT to account for time dispersion in the channel. The amount of cyclic prefix is determined based on the maximum time dispersion among all signal paths in the multiple input multiple output channel. Thus, each of inverse FFT and cyclic prefix blocks 722, 724, 726, and 728 transform the spread sequences of output chips from all of the frequency bins from the frequency domain into the time domain.

Output 723 of inverse FFT and cyclic prefix block 722, output 725 of inverse FFT and cyclic prefix block 724, output 727 of inverse FFT and cyclic prefix block 726, output 729 of inverse FFT and cyclic prefix block 728 are, thus, spread sequences of output chips in the time domain. Each of outputs 723, 725, 727, and 729 is input separately to the communication channel. For example, each spread sequence of output chips can be passed on to an FIR filter used for pulse shaping signals prior to their transmission using a separate antenna for each signal input into the communication channel. A receiver or receivers at the output of the communication channel, which may use a single antenna or multiple antennas, receives the signals, passes the signals through receive FIR filters, and performs other processing as described below in relation to FIG. 8.

Thus, FIG. 7 shows an example of a system that can be used to counteract the effects of time dispersion in a multiple input multiple output communication channel through use of OFDM combined with orthogonal transmit diversity. Thus, the system provides greater reliability of communications and increased data rate for increased bandwidth efficiency of signal transmission in a multiple input multiple output channel.

Figure 8:
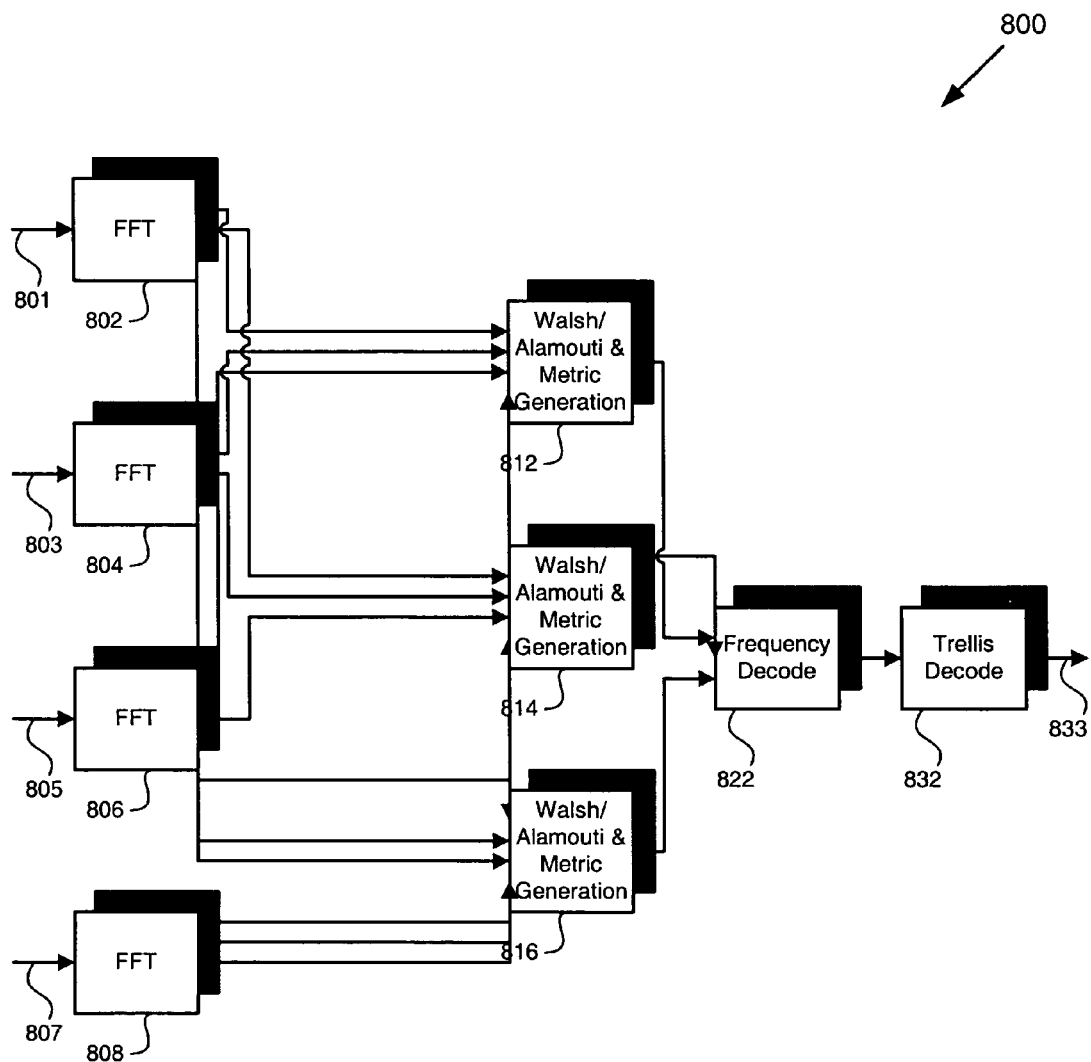
FIG. 8 illustrates, in block diagram form, an example of receiver processing for use in conjunction with the example of multiple input orthogonality and diversity using orthogonal frequency division multiplexing given in FIG. 7.

FIG. 8 illustrates an example of receiver processing which incorporates OFDM in accordance with one embodiment Exemplary system 800 shown in FIG. 8 constitutes part of a receiver which may generally reside in a subscriber unit or mobile unit when communication is taking place in a forward channel. Exemplary system 800 can be part of a subscriber unit receiver, for example, in a WCDMA communication system or spread spectrum communication system.

In exemplary system 800 shown in FIG. 8, input signals 801, 803, 805, and 807 are received from a multiple input multiple output communication channel. The communication channel can be, for example, radio frequency transmission between multiple transmit and receive antennas in a wireless communication system comprising a multiple input multiple output, or MIMO, channel as described above. For the example used in the present application, a channel with 4 transmit antennas and 4 receive antennas is illustrated. Thus each of input signals 801, 803, 805, and 807 is received on a separate receive antenna.

Continuing with FIG. 8, the receive processing shown in FIG. 8 is intended to be used with the transmit processes used in FIG. 7. The transmit process of FIG. 7 can incorporate any of the transmit processes described in connection with FIG. 1, FIG. 2, FIG. 3, or FIG. 4, as noted above. Thus, input signals 801, 803, 805, and 807 comprise time domain spread sequences of output chips from all of the frequency bins. Input signal 801 is passed to FFT block 802, input signal 803 is passed to FFT block 804, input signal 805 is passed to FFT block 806, and input signal 807 is passed to FFT block 808. Each of FFT blocks 802, 804, 806, and 808 performs an FFT operation once for each chip period of the spread sequences of output chips to transform the spread sequences of output chips from the time domain into the frequency domain to fill all of the frequency bins. The spread sequences of output chips in the frequency domain are then passed to "Walsh/Alamouti and metric generation" blocks 812, 814, and 816. There is one Walsh/Alamouti and metric generation block for each frequency bin. Recall that the example used in the present application has 3 frequency bins, thus there are 3 Walsh/Alamouti and metric generation blocks. Each block performs receiver processing for generation of metric values as described above in relation to FIGS. 5 and 6. The processing of FIG. 5 or FIG. 6, respectively, is used depending on whether the transmit processing scheme used is that of FIG. 1 or 2 or that of FIG. 3 or 4. The metric values output by each of Walsh/Alamouti and metric generation blocks 812, 814, and 816 are passed to "frequency decode" block 822. Frequency decode block 822 time multiplexes the metric values to undo the time demultiplexing performed in the example used in the present application, which was discussed above in relation to FIG. 7. If other techniques, for example, interleaving, were used, then frequency decode block 822 would include the corresponding deinterleaving, for example, as is apparent to a person of ordinary skill in the art. The frequency decoded metric values are then passed to trellis decode block 832, which can comprise a Viterbi decoder, for example, to decode the modulation symbol sequence using maximum likelihood decoding as described above. Thus, FIG. 8 shows an example of receiver processing for utilization of signal orthogonality with Alamouti transmit diversity combined with orthogonal frequency division multiplexing in a multiple input multiple output communication channel.

It is appreciated by the above description that the disclosed embodiments provide a method and system for increased bandwidth efficiency in multiple input multiple—output channels using multiple input multiple output techniques for wireless communications in a WCDMA system. According to an embodiment described above, user's information is transmitted between multiple transmit antennas and multiple receive antennas while maintaining orthogonality between antennas as well as between users. Moreover, according to an embodiment described above, diversity is also achieved while maintaining orthogonality between antennas as well as between users. Although the disclosed embodiments are described as applied to communications in a WCDMA system, it will be readily apparent to a person of ordinary skill in the art how to apply the disclosed embodiments in similar situations where orthogonal transmit diversity is needed for use with multiple transmit and receive antennas or multiple communication inputs and outputs.

From the above description, it is manifest that various techniques can be used for implementing the concepts of the presently disclosed embodiments without departing from its scope. Moreover, while the presently disclosed embodiments have been described with specific reference to certain embodiments, a person of ordinary skill in the art would recognize that changes can be made in form and detail without departing from the spirit and the scope of the presently disclosed embodiments. For example, the quadrature amplitude modulation QAM presented in an embodiment described here can be replaced by other types of modulation such as phase shift keying ("PSK"). Also, for example, the space time diversity encoding, presented in one embodiment described here, can be replaced by space frequency diversity encoding. The described embodiments are to be considered in all respects as illustrative and not restrictive. It should also be understood that the presently disclosed embodiments are not limited to the particular embodiments described herein, but is capable of many rearrangements, modifications, and substitutions without departing from the scope of the invention.

Thus, method and system for increased bandwidth efficiency in multiple input—multiple output channels have been described.

The invention claimed is:

1. A method comprising performing the steps in the order presented:
supplying an input bit stream to a channel coding block;
modulating an output of the channel coding block to provide a modulation symbol sequence and frequency coding the modulation symbol sequence;
feeding a replica of the entire frequency coded modulation symbol sequence to each of a plurality of orthogonal sequence covers, wherein each of the plurality of orthogonal sequence covers outputs one of a plurality of spread sequences of output chips;
performing inverse Fast Fourier Transform (FFT) and cyclic prefix processing on the plurality of spread sequences of output chips to yield a plurality of outputs; and transmitting the plurality of outputs over a multiple-input multiple-output channel.

2. A method comprising:
supplying an input bit stream to a coding block;
modulating an output of the coding block to provide a first modulation symbol sequence;
diversity encoding the first modulation symbol sequence to generate a second modulation symbol sequence; and
feeding the second modulation symbol sequence to a plurality of orthogonal sequence covers, wherein each of the plurality of orthogonal sequence covers outputs one of a plurality of spread sequences of output chips, and further wherein the plurality of spread sequences of output chips are transmitted over a multiple-input multiple-output channel.

3. The method of claim 2 wherein the diversity encoding is space-time encoding.

4. The method of claim 2 wherein the diversity encoding is space-frequency encoding.

5. The method of claim 2 wherein the feeding step comprises feeding a replica of the second modulation symbol sequence to a pair of the plurality of orthogonal sequence covers.

6. The method of claim 2 wherein the plurality of orthogonal sequence covers comprise pairwise mutually orthogonal Walsh covers.

7. The method of claim 2 wherein the modulating step comprises modulating the output of the coding block using trellis coded quadrature amplitude modulation.

8. The method of claim 2 further comprising:
frequency coding the modulation symbol sequence after the modulating step and before the feeding step; and
performing inverse Fast Fourier Transform (FFT) and cyclic prefix processing after the feeding step and before the plurality of spread sequences of output chips are transmitted.

9. A wireless apparatus comprising:
a coding block configured to encode an input bit stream;
a modulator configured to receive an output of the coding block to provide a first modulation symbol sequence;
an Alamouti block configured to diversity encode the first modulation symbol sequence to generate a second modulation symbol sequence; and
a plurality of orthogonal sequence covers, wherein the second modulation symbol sequence is fed to the plurality of orthogonal sequence covers and each of the plurality of orthogonal sequence covers outputs one of a plurality of spread sequences of output chips, and further wherein the plurality of spread sequences of output chips are queued for transmission over a multiple-input multiple-output channel.

10. The wireless apparatus of claim 9 wherein the Alamouti block is configured to diversity encode using space-time encoding.

11. The wireless apparatus of claim 9 wherein the Alamouti block is configured to diversity encode using space-frequency encoding.

12. The wireless apparatus of claim 9 wherein a replica of the second modulation symbol sequence is fed to a pair of the plurality of orthogonal sequence covers.

13. The wireless apparatus of claim 9 wherein the plurality of orthogonal sequence covers comprises pairwise mutually orthogonal Walsh covers.

14. The wireless apparatus of claim 9 wherein the modulator is configured to modulate the output of the coding block using trellis coded quadrature amplitude modulation.

15. A method for increasing bandwidth efficiency comprising:
- supplying an input bit stream to a coding block to generate an output;
- modulating the output to provide a first modulation symbol sequence;
- diversity encoding a plurality of time-demultiplexed portions of the first modulation symbol sequence to generate a plurality of portions of a second modulation symbol sequence; and
- feeding the plurality of portions to a plurality of orthogonal sequence covers, wherein each of the plurality of orthogonal sequence covers generates a spread sequence.

16. The method of claim 15 wherein the spread sequence from each of the plurality of orthogonal sequence covers forms a plurality of spread sequences.

17. The method of claim 16 further comprising transmitting the plurality of spread sequences over a multiple-input multiple-output (MIMO) channel.

18. The method of claim 15 wherein the diversity encoding is space-time encoding.

19. The method of claim 15 wherein the diversity encoding is space-frequency encoding.

20. The method of claim 16 wherein the feeding step comprises feeding a distinct portion of the second modulation symbol sequence to a pair of the plurality of orthogonal sequence covers 21. The method of claim 16 wherein the plurality of orthogonal sequence covers comprises a pairwise mutually orthogonal Walsh cover.

22. The method of claim 16 wherein the modulating step comprises modulating the output of the coding block using trellis coded quadrature amplitude modulation.

23. The method of claim 22 wherein the trellis coded quadrature amplitude modulation is of a rate $(n-1)/n$, wherein n is the number of bits of the output.

24. The method of claim 17 further comprising:
- frequency coding the first modulation symbol sequence; and
- performing an inverse Fast Fourier Transform (FFT) and a cyclic prefix processing on the plurality of spread sequences.

25. An apparatus for increasing bandwidth efficiency comprising:
- means for supplying an input bit stream to a coding block to generate an output;
- means for modulating the output to provide a first modulation symbol sequence;
- means for diversity encoding a plurality of time-demultiplexed portions of the first modulation symbol sequence to generate a plurality of portions of a second modulation symbol sequence; and
- means for feeding the plurality of portions to a plurality of orthogonal sequence covers, wherein each of the plurality of orthogonal sequence covers generates a spread sequence.

26. The apparatus of claim 25 wherein the spread sequence from each of the plurality of orthogonal sequence covers forms a plurality of spread sequences.

27. The apparatus of claim 26 further comprising means for transmitting the plurality of spread sequences over a multiple-input multiple-output (MIMO) channel.

28. The apparatus of claim 25 wherein the diversity encoding is space-time encoding.

29. The apparatus of claim 25 wherein the diversity encoding is space-frequency encoding.

30. The apparatus of claim 26 wherein the means for feeding is further configured for feeding a distinct portion of the second modulation symbol sequence to a pair of the plurality of orthogonal sequence covers.

31. The apparatus of claim 26 wherein the plurality of orthogonal sequence covers comprises a pairwise mutually orthogonal Walsh cover.

32. The apparatus of claim 26 wherein the means for modulating is further configured for modulating the output of the coding block using trellis coded quadrature amplitude modulation.

33. The apparatus of claim 32 wherein the trellis coded quadrature amplitude modulation is of a rate $(n-1)/n$, wherein n is the number of bits of the output.

34. The apparatus of claim 27 further comprising:
- means for frequency coding the first modulation symbol sequence; and
- means for performing an inverse Fast Fourier Transform (FFT) and a cyclic prefix processing on the plurality of spread sequences.

35. An apparatus for increasing bandwidth efficiency comprising:
- a bit stream supplier for supplying an input bit stream to a coding block to generate an output;
- a modulator for modulating the output to provide a first modulation symbol sequence; and
- a diversity encoder for diversity encoding a plurality of time-demultiplexed portions of the first modulation symbol sequence to generate a plurality of portions of a second modulation symbol sequence; and
- a plurality of orthogonal sequence covers for receiving the plurality of portions of the second modulation symbol sequence, wherein each of the plurality of orthogonal sequence covers generates a spread sequence.

36. The apparatus of claim 35 further comprising:
- a frequency coder for frequency coding the first modulation symbol sequence; and
- an inverse Fast Fourier Transform (FFT) for performing an inverse FFT and a cyclic prefix processing on the plurality of spread sequences.

* * * * *